United States Patent [19]
Tsang et al.

[11] Patent Number: 5,985,016
[45] Date of Patent: Nov. 16, 1999

[54] PURIFICATION OF MACROMOLECULAR CHROMOPHORES (MMCS) USING MEMBRANE PROCESSES FOR INK-JET INKS

[75] Inventors: Joseph W. Tsang; John R. Moffatt, both of Corvallis, Oreg.

[73] Assignee: Hewlett-Packard Company, Palo Alto, Calif.

[21] Appl. No.: 08/960,706

[22] Filed: Oct. 30, 1997

[51] Int. Cl.$^6$ ............................................. C09D 11/02
[52] U.S. Cl. ........................................ 106/31.64; 106/31.6
[58] Field of Search ........................ 106/31.32, 31.64, 106/31.6

[56] References Cited

U.S. PATENT DOCUMENTS

| | | | |
|---|---|---|---|
| 4,685,968 | 8/1987 | Palmer | 106/31.43 |
| 4,786,327 | 11/1988 | Wenzel et al. | 106/31.32 |
| 5,026,425 | 6/1991 | Hindagolla et al. | 106/31.32 |
| 5,106,416 | 4/1992 | Moffatt et al. | 106/31.43 |
| 5,133,803 | 7/1992 | Moffatt | 106/31.37 |
| 5,630,868 | 5/1997 | Belmont et al. | 106/31.75 |
| 5,830,265 | 11/1998 | Tsang et al. | 106/31.75 |

FOREIGN PATENT DOCUMENTS

| | | | |
|---|---|---|---|
| 0475075A1 | 8/1991 | European Pat. Off. | C09D 11/00 |
| 0688836A2 | 12/1995 | European Pat. Off. | C09D 11/02 |
| 0733682A1 | 9/1996 | European Pat. Off. | C09D 11/00 |
| 0802247A2 | 10/1997 | European Pat. Off. | C09D 11/00 |
| 1566948 | 5/1980 | United Kingdom | C08F 6/04 |

*Primary Examiner*—Helene Klemanski

[57] ABSTRACT

A process is provided for purifying macromolecular chromophores (MMCs), which are pigments that have been surface-treated to be water-soluble. In the surface treatment, anionic or cationic functional groups are covalently bonded onto the surface, these functional groups have undesirable counter-ions associated with them that adversely affect the properties of ink-jet inks in which the MMCs are incorporated. The purification process comprises: (a) forming an aqueous solution of the macro-molecular chromophore; (b) adding to the aqueous solution an amount of a liquid containing a desirable counter-ion; (c) subjecting the aqueous solution to membrane filtration; and (d) repeating steps (b) and (c). Inks prepared from MMCs that are purified as described above evidence significant improvement in reliability, which includes reduced crusting, reduced kogation, and improved long term ink stability.

21 Claims, No Drawings

PURIFICATION OF MACROMOLECULAR CHROMOPHORES (MMCS) USING MEMBRANE PROCESSES FOR INK-JET INKS

TECHNICAL FIELD

The present invention relates generally to ink compositions for ink-jet printers and, more particularly, to such ink compositions containing one or more macro-molecular chromophores (MMCs), in which the MMCs are purified.

BACKGROUND ART

It is well-known that the purity of water-soluble dyes are paramount toward the reliability performance of ink-jet inks. Commercially-available dyes often contain significant amounts of organic and inorganic impurities which are undesirable for digital printing applications, such as thermal ink-jet printers. Residual impurities degrade reliability performance by kogating on the resistor surface as well as crusting at nozzles. Some of the impurities found in water-soluble dyes are sodium chloride and sodium sulfate.

Macromolecular chromophores (MMCs) are derived through chemical treatment of pigments, whereby water-solubilizing groups are bonded covalently on the pigment particle. Colorants of this type are water-soluble and self-dispersible without requiring the use of dispersing agents.

Two commercial suppliers of these MMCs are Orient Chemicals and Cabot Corporation. During the chemical treatment, unreacted starting materials and by-products are found to remain on the MMCs. Through chemical analysis, it has been determined that the amounts of impurities exceed those of ink-jet grade dyes. Crusting is particularly evident in commercially-available MMCs.

At least two processes are presently known for modifying ink-jet grade dyes. These include (1) reverse osmosis, as disclosed, for example, in U.S. Pat. No. 4,685,968, issued Aug. 11, 1987, to Donald J. Palmer and assigned to the same assignee as the present application, and (2) ion exchange, as disclosed, for example, in U.S. Pat. No. 4,786,327, issued Nov. 22, 1988, to Donald E. Wenzel et al and assigned to the same assignee as the present application. In both instances, the primary purpose of the respective process is to effect a change of the counter-ion associated with the dye. However, both patents suggest the use of reverse osmosis to purify the dye.

While the foregoing references are certainly useful for purifying dyes used in ink-jet inks, more recent advances have resulted in the use of pigments, particularly pigments modified in some fashion, to produce MMCs. A process is required for purifying MMCs to a purity level acceptable for ink-jet applications.

DISCLOSURE OF INVENTION

In accordance with the present invention, a process is provided for purifying MMCs. The process comprises the use of ultrafiltration to purify MMCs to a level acceptable for ink-jet applications. Through purification, residual cations and anions that are not associated with ionizing functional groups are removed, such as excess salts. Furthermore, unreacted starting material and reaction by-products that result from the chemical treatment of the pigment are also removed. The removal of the foregoing materials results in an MMC that is considered to be an ink-jet grade colorant.

The process of the present invention comprises:

(a) forming an aqueous solution of the macromolecular chromophore;
(b) adding to the aqueous solution an amount of a liquid containing a desirable counter-ion;
(c) subjecting the aqueous solution to ultrafiltration; and
(d) repeating steps (b) and (c).

Inks prepared from MMCs that are purified as described above evidence significant improvement in reliability, which includes reduced crusting, reduced kogation, and improved long term ink stability.

BEST MODES FOR CARRYING OUT THE INVENTION

Macromolecular chromophores (MMCs) are derived through the chemical treatment of pigments, whereby water-solubilizing groups are bonded covalently on the pigment particle. Colorants of this type are water-soluble, and do not require the use of pigment dispersing agents; such dispersing agents are presently required for dispersing pigments in aqueous ink-jet inks. MMCs are presently available in anionic and cationic forms. In the anionic case, sulfonate and carboxylate functional groups are introduced onto the surface of the pigment particles, while in the cationic case, ammonium functional groups are introduced onto the surface. While other water-solubilizing functional groups may be employed, these are presently used in commercially-produced MMCs.

Whether in anionic or cationic form, the functional groups are associated with undesirable ions and high ionic strength. In the case of sulfonate or carboxylate functional groups, the cation associated with the functional group is usually excess sodium cation. In the case of ammonium functional groups, the anion associated with the functional group is usually excess chloride anion. Such excess ions are considered to be excess because their concentration exceeds the stoichiometry and charge neutrality of the MMCs.

In accordance with the present invention, undesirable cations, such as excess sodium, and undesirable anions, such as excess chloride or sulfate, are removed by ultrafiltration. The ultrafiltration process, also known as microfiltration or membrane filtration, is carried out using conventional membranes, such as polysulfone or thin film composite membranes, such as available from the Osmonics Company. The particular membrane used is based on the size of the impurities to be removed. Specifically, the membrane is characterized either in terms of the molecular weight (weight average) cut-off, which is in the range of 2,000 to 12,000, calibrated, for example, to polyethylene glycol (PEG), or the porosity, which is in the range of 0.02 to 1 $\mu$m.

As a further feature of the process of the invention, desired ions are added to a solution of the MMCs and the ion exchange allowed to occur. Undesired ions are then removed by ultrafiltration. Ionic strength is used as an indication of when equilibrium is reached, which is determined by no further change in ionic strength. The ionic strength may be measured by the pH or by the electrical conductivity of the permeate. Alternatively, the ionic strength of the concentrate may be measured.

Additional ions are then added and the ultrafiltration process repeated. The cycle is repeated as often as necessary, until no further improvement is seen. By "improve-ment" is meant that there is no change in ionic strength of the permeate (or of the concentrate) with time.

The amount of MMC in solution (aqueous), that is, in the concentrate, is within the range of 0.2 to 25 wt %. Preferably, the concentration of MMC is in the range of 5 to 15 wt %.

It is contemplated that excess ions over the stoichiometric amount of MMC are removed by the process of the present invention, along with ions of the opposite charge, to maintain electrical neutrality. In addition to the ion removal process, ions associated with the MMC may be replaced, if desired.

When the surface modification of the macromolecular pigment provides anionic functional groups on the surface of the particle (anionic MMCs), the counterions must be cations. Generally, potassium, sodium, and any ammonium-based ion (including quaternary ions) may be used in the practice of this invention as the counterion to an anionic MMC. Some classes of these ions employed in the practice of this invention include, but are not limited to, N,N',N''-substituted and unsubstituted ammonium ions, N,N',N'',N'''-substituted and unsubstituted amides of 1,ω-amino acids, N,N'-substituted and unsubstituted lactams of 1,ω-amino acids, N,N',N''-substituted and unsubstituted esters of 1,ω-amino acids, N,N'-substituted and unsubstituted lactones of 1,ω-amino acids. Preferred counterions include ammonium, diethylammonium, trimethylammonium, tetramethylammonium and dipropyl ammonium.

The terms N,N',N''-substituted and unsubstituted ammonium ions are intended to encompass any substituted or unsubstituted ammonium ion with up to three different alkyl (saturated or unsaturated) and/or aryl substitutions. The preferred number of carbon atoms for each alkyl or aryl group is between 1 and 30 carbon atoms.

The terms N,N',N'',N'''-substituted and unsubstituted amides of 1,ω-amino acids are intended to encompass any substituted or unsubstituted amides of 1,ω-amino acids with a carbon backbone of 1 to 20 carbon atoms and with up to four different saturated or unsaturated alkyl and/or aryl substitutions. The number of carbon atoms totaled over all four R groups is between 1 and 40 carbon atoms.

The terms N,N'-substituted and unsubstituted lactams of 1,ω-amino acids are intended to encompass any substituted or unsubstituted lactam of a 1,ω-amino acid with a carbon backbone of 1 to 20 carbon atoms, with a lactam ring of 1 to 20 carbon atoms and with up to two different saturated or unsaturated alkyl and/or aryl substitutions. The preferred number of carbon atoms for each substitution is between 1 and 20 carbon atoms.

The terms N,N',N''-substituted and unsubstituted esters of 1,ω-amino acids are intended to encompass all substituted ester of a 1,ω-amino acid with a carbon backbone of 1 to 20 carbon atoms and with up to three different saturated or unsaturated alkyl and/or aryl substitutions. The number of carbon atoms totaled over all substitutions is between 1 and 30 carbon atoms. To provide improved waterfastness, one of the N-substitution sites in this class of molecules should contain H.

The terms N,N'-substituted and unsubstituted lactones of 1,ω-amino acids are intended to encompass all substituted lactones of a 1,ω-amino acid with a carbon backbone of 1 to 20 carbon atoms, with a lactone ring of 1 to 20 carbon atoms and with up to two different saturated or unsaturated alkyl and aryl substitutions. The number of carbon atoms totaled over all substitutions is between 1 and 20 carbon atoms.

When the surface modification of the macromolecular pigment provides cationic functional groups on the surface of the particle (cationic MMCs), the counterions must be anions. Anionic counterions employed in the practice of this invention include, but are not limited to, halide, nitrate, phosphate, aryl or arene sulfonate, carboxylate, carbonate, bicarbonate, borate, tetraborate, tetrafluoroborate, methane sulfonate, toluene sulfonate, phosphite, phosphonate, hexaflurophosphonate, phosphene, phenolate, perchlorate, tungstate, molybdate, hydroxide, sulfate, and silicate ions.

All concentrations herein are expressed in weight percentages, unless otherwise indicated. The purity of all components is that employed in normal commercial practice for ink-jet inks.

Without the process of the invention, many reliability issues are encountered, including decap, kogation and crusting, that are eliminated, or substantially reduced, by use of the process of the present invention.

Once the MMC is purified, it can then be combined with other common ingredients used in formulating ink-jet inks. The ink comprises the purified MMC plus a vehicle. A typical formulation for an ink useful in the practice of the invention includes the MMC (about 0.5 to 20 wt %), one or more cosolvents (0 to about 50 wt %), one or more water-soluble surfactants/amphiphiles (0 to about 40 wt %), one or more high molecular weight colloids (0 to about 3 wt %), and water (balance).

One or more cosolvents may be added to the vehicle in the formulation of the ink. Classes of cosolvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly (propylene glycol) alkyl ethers, higher homologs of poly (propylene glycol) alkyl ethers, N-alkyl caprolactams, unsubstituted caprolactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. The cosolvent concentration may range from 0 to about 50 wt %, with about 0.1 to 15 wt % being preferred.

Water-soluble surfactants may be employed in the formulation of the vehicle of the ink. For convenience, examples of surfactants are divided into two categories: (1) non-ionic and amphoteric and (2) ionic. The former class includes: TERGITOLs, which are alkyl polyethylene oxides available from Union Carbide; TRITONs, which are alkyl phenyl polyethylene oxide surfactants available from Rohm & Haas Co.; BRIJs; PLURONICs (polyethylene oxide block copolymers); and SURFYNOLs (acetylenic polyethylene oxides available from Air Products); POE (polyethylene oxide) esters; POE diesters; POE amines; protonated POE amines; POE amides; and dimethicone copolyols. Ionic surfactants such as substituted amine oxides are useful in the practice of this invention. U.S. Pat. No. 5,106,416, "Bleed Alleviation Using Zwitterionic Surfactants and Cationic Dyes" discloses more fully most of the surfactants listed above. The non-ionic amphiphiles/surfactants are more preferred than the ionic surfactants. Specific examples of amphiphiles/surfactants that are preferably employed in the practice of this invention include, but are not limited to, isohexadecyl ethylene oxide 20, SURFYNOL CT-111, TERGITOL 15-S-7, and amine oxides, such as N,N-dimethyl-N-docecyl amine oxide, N,N-dimethyl-N-tetradecyl amine oxide, N,N-dimethyl-N-hexadecyl amine oxide, N,N-dimethyl-N-octadecyl amine oxide, and N,N-dimethyl-N-(Z-9-octadecenyl)-N-amine oxide. The concentration of the amphiphiles/surfactants may range from 0 to about 40 wt %, with 2.5 wt % being preferred.

To improve optical density, between 0 and about 3 wt % of at least one high molecular weight colloid derived from natural or synthetic sources may optionally be added to the ink formulation. Addition of a high molecular weight colloid improves print quality. Examples of high molecular weight colloids employed in the practice of this invention include, but are not limited to, alginates, mannuronic acid, carageenan, guar gum, xanthan gum, dextran, chitin, chitosan, carboxymethylcellulose, nitromethylcellulose, and all derivatives thereof. These colloids are disclosed in U.S. Pat. No. 5,133,803, "High Molecular Weight Colloids which Control Bleed." The preferred high molecular weight colloids employed in the practice of this invention include, but are not limited to, low viscosity, Na alginate. The preferred concentration of the high molecular weight component colloid in the inks of this invention is about 0.25 wt %.

Consistent with the requirements for this invention, various types of additives may be employed in the ink to optimize the properties of the ink composition for specific applications. For example, as is well-known to those skilled in the art, biocides may be used in the ink composition to inhibit growth of microorganisms, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The inks are formulated by combining the various components of the vehicle and mixing them with the macromolecular chromophore after exchanging the counterion as disclosed herein.

The inks containing colorants with counterion substitution as described herein demonstrate high edge acuity, high optical density, fast drying times, high waterfastness, and high smearfastness.

EXAMPLES

In Table 1 below, examples are listed to show the membranes used for purification and exchange processes. Table II lists the analytical results (in parts per million —ppm) before and after the membrane purification.

Example 1

A membrane apparatus was charged with 2 liters of 10 wt % Cabojet 300 solution (fully carboxylated MMC with sodium as counterion). An ultrafiltration membrane consisting of a proprietary thin-film composite with a molecular weight cutoff at 2,000 on polyethylene glycol was used. Ten grams of 0.5 M potassium hydroxide solution were added to the concentrate to exchange for the sodium counterion. After the pH of the solution dropped to about 8 to 9 within 8 hours, this step was repeated 3 times. The permeate and concentrate were analyzed for impurities, and they are listed in Table II below. The purified material was concentrated on the membrane apparatus and collected as the potassium form of Cabojet 300.

Example 2

A membrane apparatus was charged with 2 liters of 10 wt % Cabojet 300 solution. An ultrafiltration membrane consisting of a proprietary thin-film composite with a molecular weight cutoff at 12,000 on polyethylene glycol was used. Ten grams of 0.5 M potassium hydroxide solution were added to the concentrate to exchange for the sodium counterion. After the pH of the solution dropped to about 8 to 9 within 8 hours, this step was repeated 3 times. The permeate and concentrate were analyzed for impurities, and they are listed in Table II below. The purified material was concentrated on the membrane apparatus and collected as the potassium form of Cabojet 300.

Example 3

A membrane apparatus was charged with 2 liters of 10 wt % Cabojet 300 solution. An ultrafiltration membrane consisting of a proprietary thin-film composite with a molecular weight cutoff at 12,000 on polyethylene glycol was used. Five grams of 10 wt % tetramethylammonium hydroxide solution were added to the concentrate to exchange for the sodium counterion. After the pH of the solution dropped to about 8 to 9 within 8 hours, this step was repeated 3 times. The permeate and concentrate were analyzed for impurities, and they are listed in Table II below. The purified material was concentrated on the membrane apparatus and collected as the tetramethylammonium (TMA) form of Cabojet 300.

Example 4

A membrane apparatus was charged with 2 liters of 10 wt % Cabojet 300 solution. An ultrafiltration membrane consisting of a proprietary thin-film composite with a molecular weight cutoff at 12,000 on polyethylene glycol was used. Five grams of dimethylamine were added to the concentrate to exchange for the sodium counterion. After the pH of the solution dropped to about 8 to 9 within 8 hours, this step was repeated 3 times. The permeate and concentrate were analyzed for impurities, and they are listed in Table II below. The purified material was concentrated on the membrane apparatus and collected as the dimethyl-ammonium (DMA) form of Cabojet 300.

Example 5

A membrane apparatus was charged with 2 liters of 10 wt % Cabojet 200 solution (sulfonated MMC with sodium as counterion). An ultrafiltration membrane consisting of a proprietary thin-film composite with a molecular weight cutoff at 2,000 on polyethylene glycol was used. Ten grams of 1 M potassium hydroxide solution was added to the concentrate to exchange for the sodium counterion. After the pH of the solution dropped to about 7 to 8 within 8 hours, this step was repeated 3 times. The permeate and concentrate were analyzed for impurities, and they are listed in Table II below. The purified material was concentrated on the membrane apparatus and collected as the potassium form of Cabojet 200.

Example 6

A membrane apparatus was charged with 2 liters of 10 wt % Cabojet 300 solution (fully carboxylated MMC with sodium as counterion). A microfiltration membrane consisting of a PTFE fluorocarbon (Teflon) with an average porosity of 0.2 $\mu$m was used. Ten grams of 0.5 M potassium hydroxide solution was added to the concentrate to exchange for the sodium counterion. After the pH of the solution dropped to about 8 to 9 within 8 hours, this step was repeated 3 times. The permeate and concentrate were analyzed for impurities, and they are listed in Table II below. The purified material was concentrated on the membrane apparatus and collected as the potassium form of Cabojet 300.

TABLE I

Membrane Used for Purification and Exchange.

| Example | Membrane | Specification |
|---------|----------|---------------|
| 1 | TFC*, ultrafiltration | 2,000 MW cutoff for polyethylene glycol |
| 2 | TFC*, ultrafiltration | 12,000 MW cutoff for polyethylene glycol |
| 3 | TFC*, ultrafiltration | 12,000 MW cutoff for polyethylene glycol |
| 4 | TFC*, ultrafiltration | 12,000 MW cutoff for polyethylene glycol |
| 5 | TFC*, ultrafiltration | 2,000 MW cutoff for polyethylene glycol |
| 6 | Teflon ™, microfiltration | 0.2 μm porosity |

*TFC = thin-film composite

TABLE II

Analytical Results (in ppm).

| Example | Purification | Nitrite | Nitrate | Sulfate | Sodium | Pigment |
|---------|--------------|---------|---------|---------|--------|---------|
| 1 | before | 795 | 190 | 60 | 2500 | Na⁺-Cabojet 300 |
|   | after | ND* | ND* | ND* | 15 | K⁺-Cabojet 300 |
| 2 | before | 795 | 190 | 60 | 2500 | Na⁺-Cabojet 300 |
|   | after | ND* | ND* | ND* | 10 | K⁺-Cabojet 300 |
| 3 | before | 795 | 190 | 60 | 2500 | Na⁺-Cabojet 300 |
|   | after | ND* | ND* | ND* | 8 | TMA⁺-Cabojet 300 |
| 4 | before | 795 | 190 | 60 | 2500 | Na⁺-Cabojet 300 |
|   | after | ND* | ND* | ND* | 5 | DMA⁺-Cabojet 300 |
| 5 | before | 128 | 94 | 158 | 2200 | Na⁺-Cabojet 200 |
|   | after | ND* | ND* | ND* | 10 | K⁺-Cabojet 200 |
| 6 | before | 795 | 190 | 60 | 2500 | Na⁺-Cabojet 300 |
|   | after | ND* | ND* | ND* | 12 | K⁺-Cabojet 300 |

*Not detected

The results in Table II demonstrate the considerable reduction in sodium cations and the essentially complete elimination of nitrite, nitrate, and sulfate anions (impurities).

Printing Test Results

Inks prepared from membrane-purified MMCs showed significant improvement in reliability, for example, decap. Decap time was extended from 5 to 10 sec to values greater than 60 sec in the same vehicle composition. Improvement in kogation was also observed.

Industrial Applicability

The macromolecular chromophores purified by the process described herein are expected to find use in ink-jet printing technology.

Thus, there has been disclosed a process for purifying macromolecular chromophores for use in ink-jet inks that render the inks less susceptible to decap and kogation. It will be appreciated by those skilled in this art that various changes and modifications can be made without departing from the spirit of the invention, and all such changes and modifications are considered to fall within the scope of the present invention, as defined by the appended claims.

What is claimed is:

1. A process for purifying a macromolecular chromophore comprising a pigment whose surface has been chemically modified to have either anionic or cationic functional groups and impurities, said functional groups having an undesirable counter-ion associated therewith, said process comprising:

(a) forming an aqueous solution of said macromolecular chromophore and impurities;

(b) adding to said aqueous solution an amount of a liquid containing a desirable counter-ion;

(c) subjecting said aqueous solution to membrane filtration to form a permeate and a concentrate, with said macromolecular chromophore contained in said concentrate and said impurities contained in said permeate;

(d) repeating steps (b) and (c), whereby said undesirable counter-ion associated with said macromolecular chromophore is at least partially replace with said desirable counter-ion, and wherein said impurities are selected from the group, consisting of excess counter-ions, unreacted starting materials, reaction by-products from said chemical modification of said pigment and mixtures thereof.

2. The process of claim 1 wherein said aqueous solution contains said macromolecular chromophore within a range of about 0.2 to 25 wt %.

3. The process of claim 2 wherein said macromolecular chromophore is within the range of about 5 to 15 wt %.

4. The process of claim 1 wherein said functional groups are anionic.

5. The process of claim 4 wherein said functional groups are selected from the group consisting of carboxylate and sulfonate.

6. The process of claim 4 wherein said undesirable counter-ion is excess sodium.

7. The process of claim 4 wherein said desirable counter-ion is a cation selected from the group consisting of N,N', N"-substituted ammonium ions, N,N',N"-unsubstituted ammonium ions, N,N',N",N'"-substituted amides of 1,ω-amino acids, N,N',N",N'"-unsubstituted amides of 1,ω-amino acids, N,N'-substituted lactams of 1,ω-amino acids, N,N'-unsubstituted lactams of 1,ω-amino acids, N,N',N"-substituted esters of 1,ω-amino acids, N,N',N"-unsubstituted esters of 1,ω-amino acids, N,N'-substituted lactones of 1,ω-amino acids, N,N'-unsubstituted lactones of 1,ω-amino acids, potassium, ammonium, and sodium.

8. The process of claim 7, wherein said desirable counter-ion is selected from the group consisting of tetramethylammonium, dimethylammonium, trimethylammonium, and dipropylammonium.

9. The process of claim 1 wherein said functional groups are cationic.

10. The process of claim 9 wherein said functional group is based on ammonium.

11. The process of claim 9 wherein said undesirable counter-ion is excess chloride or sulfate.

12. The process of claim 9 wherein said desirable counter-ion is selected from the group consisting of halide, nitrate, phosphate, aryl sulfonate, arene sulfonate, carboxylate, carbonate, bicarbonate, borate, tetraborate, tetrafluoroborate, methane sulfonate, toluene sulfonate, phosphite, phosphonate, hexaflurophosphonate, phosphene, phenolate, perchlorate, tungstate, molybdate, hydroxide, sulfate, and silicate ions.

13. The process of claim 12 wherein said desirable counter-ion is selected from the group consisting of bromide, methane sulfonate, phosphate, bicarbonate, carbonate, borate, toluene sulfonate, chloride, and hydroxide.

14. The process of claim 1 wherein said membrane has a cut-off within a molecular weight range given by 2,000 to 12,000 relative to polyethylene glycol.

15. The process of claim 1 wherein said membrane has a cut-off within a porosity range of about 0.02 to 1 $\mu$m.

16. The process of claim 1 wherein said process is monitored by measuring ionic strength of either said concentrate or said permeate and said process is terminated when there is no longer any appreciable change in said ionic strength.

17. A process for providing an ink-jet ink having improved reliability, comprising:
   (a) providing an aqueous solution comprising
      (i) a macromolecular chromophore comprising a pigment whose surface has been chemically modified to have either anionic or cationic functional groups, and
      (ii) impurities selected from the group consisting of excess counter-ions, unreacted starting materials, reaction by-products from said chemical modification of said pigment, and mixtures thereof;
   (b) subjecting said aqueous solution to membrane filtration to form a permeate and a concentrate, with said macromolecular chromophore contained in said concentrate and said impurities in said permeate;
   (c) repeating step (b) a sufficient number of times to provide a purified macromolecular chromophore having a desired purity; and
   (f) adding components to said purified macromolecular chromophore to form said ink-jet ink.

18. The process of claim 17 wherein said ink-jet ink comprises:
   (a) 0 to about 50 wt % of at least one cosolvent, 0 to about 40 wt % of at least one water-soluble surfactant or amphiphile, and 0 to about 3 wt % of at least one high molecular weight colloid;
   (b) about 0.5 to 20 wt % of said purified macromolecular chromophore; and
   (c) the balance water.

19. The process of claim 17 wherein said excess counter-ions over the stoichiometric amount of counter-ions required to achieve electrical neutrality with said anionic or cationic functional groups of said macromolecular chromophore are filtered into said permeate.

20. A process for providing an ink-jet having improved reliability, comprising:
   (a) providing a macromolecular chromophore comprising a pigment whose surface has been chemically modified to have either anionic or cationic functional groups and impurities, wherein said impurities are selected from the group consisting of excess counter-ions, unreacted starting materials, reaction by-products from said chemical modification of said pigment and mixtures thereof and wherein said functional groups having an undesirable counter-ion associated therewith;
   (b) forming an aqueous solution of said macromolecular chromophore and impurities;
   (c) adding to said aqueous solution an amount of a liquid containing a desirable counter-ion;
   (d) subjecting said aqueous solution to membrane filtration to form a permeate and a concentrate, with said macromolecular chromophore contained in said concentrate and said impurities contained in said permeate;
   (e) repeating steps (b) and (c) a sufficient number of times to provide a purified macromolecular chromophore having a desire purity; and
   (f) adding components to said purified macromolecular chromophore to form said ink-jet ink.

21. The process of claim 20 wherein said ink-jet ink comprises:
   (a) 0 to about 50 wt % of at least one cosolvent, 0 to about 40 wt % of at least one water-soluble surfactant or amphiphile, and 0 to about 3 wt % of at least one high molecular weight colloid;
   (b) about 0. 5 to 20 wt % of said purified macromolecular chromophore; and
   (c) the balance water.

* * * * *